United States Patent [19]

Rialan et al.

[11] Patent Number: 4,628,494
[45] Date of Patent: Dec. 9, 1986

[54] METHOD FOR THE REMOTE CONTROL OF SIGNAL ACQUISITION DEVICES BY MEANS OF A NARROW PASSBAND TRANSMISSION CHANNEL AND A DEVICE FOR THE IMPLEMENTATION OF THE METHOD

[75] Inventors: Joseph Rialan, Meudon; Gérard Thierry, Paris, both of France

[73] Assignee: Institut Francais du Petrole, Rueil Malmaison, France

[21] Appl. No.: 562,223

[22] Filed: Dec. 16, 1983

[30] Foreign Application Priority Data

Dec. 16, 1982 [FR] France .................. 82 21284

[51] Int. Cl.⁴ .................. G01V 1/22; G01V 1/26
[52] U.S. Cl. .................. 307/79; 455/56; 375/112; 370/118; 340/825.64
[58] Field of Search .................. 367/76–79; 455/51, 53, 56, 68; 375/110, 112, 113; 370/118; 340/825.64

[56] References Cited

U.S. PATENT DOCUMENTS

| | | |
|---|---|---|
| 2,817,775 | 12/1957 | Rosenberg et al. .......... 340/825.64 |
| 3,916,371 | 10/1975 | Broding .................. 367/78 |
| 4,072,923 | 2/1978 | Siems et al. .................. 367/78 |
| 4,140,972 | 2/1979 | Enriques et al. .................. 375/113 |
| 4,251,812 | 2/1981 | Okada et al. .................. 340/825.64 |
| 4,255,620 | 3/1981 | Harris et al. .................. 370/118 |
| 4,320,472 | 3/1982 | Fort .................. 367/79 |
| 4,339,824 | 7/1982 | Tanimoto .................. 375/113 |
| 4,509,170 | 4/1985 | Hollinger et al. .................. 367/79 |

FOREIGN PATENT DOCUMENTS

| | | | |
|---|---|---|---|
| 2433191 | 1/1975 | Fed. Rep. of Germany | 367/79 |
| 2102838 | 3/1972 | France | 367/77 |
| 0972432 | 11/1982 | U.S.S.R. | 367/77 |

Primary Examiner—Nelson Moskowitz
Attorney, Agent, or Firm—Antonelli, Terry & Wands

[57] ABSTRACT

In a system for seismic exploration, a narrow passband channel of relatively-slow transmission speed is used to transmit commands from a control station to one or more remote signal acquisition devices to initiate acquisition and processing of echo signals generated by triggering of a seismic signal generator at a selected reference time. To permit use of the slow speed transmission channel for transmitting commands without delay in the recording of the echo signals, a first command to initiate processing and recording of received signals is transmitted to the acquisition devices prior to the selected reference time by an amount of time at least equal to the transmission time of the narrow passband channel. This first command also initiates in each acquisition device the counting of signal samples which are being recorded at a predetermined rate. A second command is transmitted at the selected reference time and upon receipt of this command, the count of signal samples is latched and a number is subtracted from this count based on the transmission time of the narrow passband channel to identify the signal samples which were processed and recorded beginning at the selected reference time.

20 Claims, 4 Drawing Figures

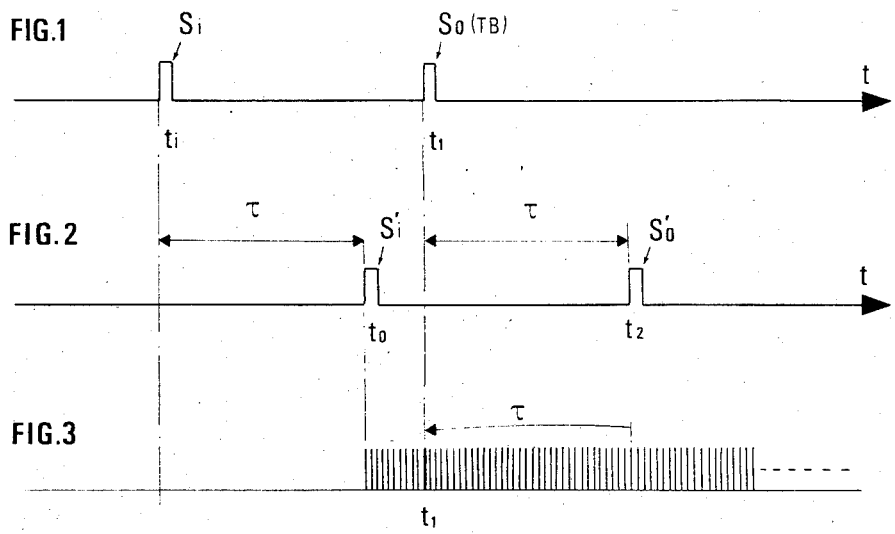

METHOD FOR THE REMOTE CONTROL OF SIGNAL ACQUISITION DEVICES BY MEANS OF A NARROW PASSBAND TRANSMISSION CHANNEL AND A DEVICE FOR THE IMPLEMENTATION OF THE METHOD

FIELD OF THE INVENTION

The present invention relates in general to a method and apparatus for the remote control of devices located at a distance from a control station and involves the use of a narrow passband channel for transmission of commands, the transmission time of which is preset by the selected transmission channel. More particularly, the invention is directed to the field of seismic exploration.

BACKGROUND OF THE INVENTION

It is known in the field of seismic exploration to effect remote control, from a central command and recording system (control station), of data acquisition devices, each of which is provided for collecting data signals which are received, for example, by one or more signal receivers, and for processing and recording these data signals. Such a method is helpful, for example, in providing to remote acquisition devices a reference time (TB) when a seismic signal generator is triggered, so that these devices can begin to collect the data signals provided by seismic sensors or groups of seismic sensors distributed along a seismic profile to be explored in response to the echoes from shocks communicated to the ground by the seismic signal generator on the various underground reflective layers, before these data signal are transmitted to the central command and recording system, usually by radio. Such an acquisition device is described in published French Patent Application No. 2,511,772.

In order to avoid any delay in the transmission of the signal which defines this reference time (TB) and in order to ensure the initialization of the acquisition devices before the arrival of the first echoes, it is possible to use, for example, a high-speed transmission channel to transmit this signal to the various acquisition devices. This transmission channel can be, for example, the same wide passband radio channel which is provided for transmitting the data signals collected by the acquisition devices to the central command and recording system. However, in this case, when the signal which indicates the reference time has been transmitted and received by the radio transmission-reception devices associated with the various data acquisition devices, it is necessary to perform fast switching between the transmitting and receiving sections of these devices, as well as between the corresponding sections of the transmitter-receiver associated with the central command and recording system in order to ensure that the seismic data signals which are collected can be transmitted and received immediately at the respective ends of the transmission channel. Unfortunately, this procedure has drawbacks due to the fact that the fast switching of the transmitters and receivers is not easy to accomplish.

On the other hand, the use of a second wide passband radio channel to transmit the signal which represents the reference time has not always been possible due to the restrictions on the availability of such communication channels imposed by the regulations regarding radio transmission. Less restrictions are imposed on the availability of narrow passband transmission channels; however, such transmission channels are known to operate at a relatively-slow transmission speed which would not be suitable in conventional systems to ensure initialization of the acquisition devices before the arrival of the first echoes.

SUMMARY OF THE INVENTION

The basic objective of the present invention is the provision of a method and apparatus for the remote control of signal acquisition devices which solves the above-mentioned problems that are inherent in prior methods and apparatus of the type described.

The method of the invention proposes to transmit the signal which indicates the reference time by means of a narrow-band transmission channel, the use of which is regulated less restrictively, while avoiding the drawbacks inherent in limiting the transmission bandwidth; and, this channel is also used for transmitting commands in the form of control signals from the central command and recording system to the various acquisition devices to control their operation.

This method involves the use of a narrow passband transmission channel for the commands which makes it possible for these acquisition devices to record, at a selected reference time, and reproduce later all of the data signals received, but excluding any unwanted signals which may be received prior to the selected reference time.

The method of the invention is characterized by the fact that it includes the transmission of a first control signal on the above-mentioned narrow-band transmission channel at an initial time which precedes the reference time by a time interval which is at least equal to and preferably is greater than the transmission time ($\tau$) of the transmission channel, the reception of this first command signal serving to trigger the processing and recording of signals received from the sensors. This is followed by the transmission of a second command signal on the above-mentioned narrow-band transmission channel at the selected reference time ($t_1$) at which the seismic signal generator is triggered, with this second signal being received by the user devices at a later time ($t_2$). Based on the time of receipt of this second signal, a selection is made from among all of the signals recorded by the above-mentioned user devices, of those signals which are recorded starting at time ($t_2 - \tau$), so that only the data signals recorded after the selected reference time ($t_1$) are selected for transmission back to the central control station, for example, on the wide passband transmission channel which may be provided for this purpose.

Thus, using a narrow-band transmission channel and consequently operating at a relatively-slow transmission speed, the method of the invention makes it possible to command the acquisition and recording of all the wanted signals which are received after the reference time and to indicate to each of the acquisition devices the reference time as of which the recordings made must be noted.

BRIEF DESCRIPTION OF THE DRAWINGS

The method as well as an exemplary means of constructing the apparatus for implementing the method will be described below with reference to the accompanying drawings, in which:

FIG. 1 shows a timing diagram of the first signal and second signal which are sent in succession on the transmission channel.

FIG. 2 shows a timing diagram of the first and second signals when they are received by the user device after a propagation time which is characteristic of the transmission channel being used.

FIG. 3 shows the timing diagram of the various samples of signals which are recorded in succession by the recording instruments of the user device.

DETAILED DESCRIPTION OF THE PREFERRED EMBODIMENT

Figure 4:
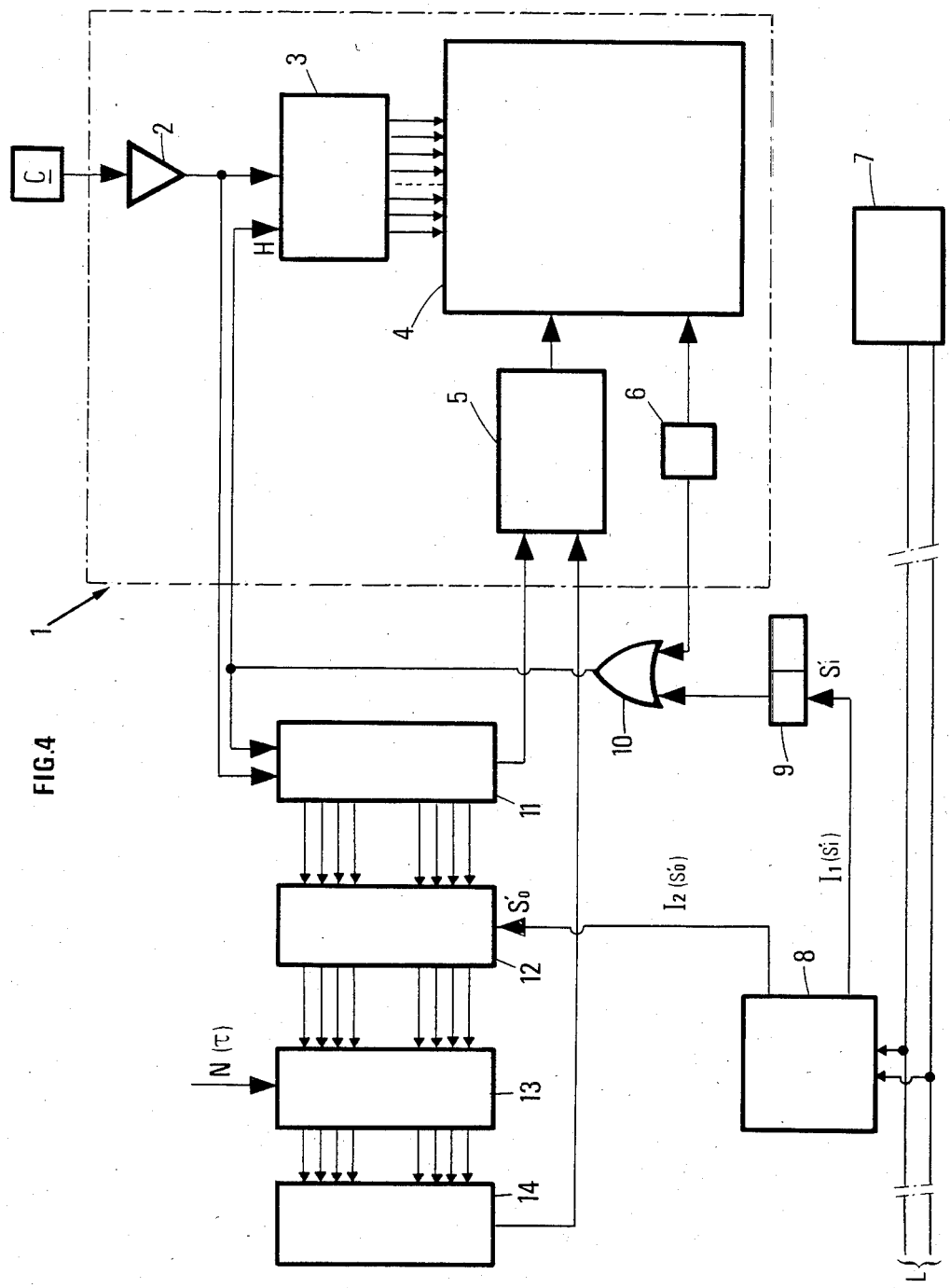
FIG. 4 is a schematic diagram of one embodiment of the apparatus for implementing the method of the invention.

In the timing diagram of FIG. 1, time $t_1$ indicates the initial time when the first signal Si is sent on a narrow-band transmission channel. The user devices receive the corresponding signal S'i (FIG. 2) at time $t_0$. The propagation time interval $\tau$ depends on the passband of the transmission channel and constitutes a known characteristic of it. If the passband is, for example, 3 kHz, the capacity of the transmission channel is 300 baud and, for a signal Si of 12 bits, for example, the propagation time over the channel will be 36 msec. This constant time interval $\tau$ is determined by prior measurements.

The reception of the corresponding signal S'i by the user devices causes them to begin to receive the various signals originating from the various sensors to which they are connected and to record these different signals. The signals which are recorded starting at time $t_0$ and prior to the reference time $t_1$ essentially correspond to background noise. However, because the reception phase is started at time $t_0$, it is ensured that all of the wanted data signals arriving after the reference time $t_1$ will be recorded as they arrive, and consequently, will be available in storage for transmission to the control station.

At the reference time $t_1$ after $t_0$, a reference signal So is transmitted from the control station on the transmission channel (FIG. 1). Time $t_1$ corresponds, for example, to time TB when a seismic source is triggered, and the reference signal So constitutes a signal acquisition command for the various user devices. This command is transmitted on the narrow transmission channel and, after a propagation time $\tau$ which is characteristic of the channel, the acquisition devices detect a signal S'o at a time $t_2$ (FIG. 2).

To make allowance for the fact that the reception of the wanted data signals (which correspond, for example, to the echoes from various underground reflectors from a seismic signal transmitted through the ground by a seismic generator starting at time $t_1$) commences before time $t_2$ when the user device receives signal So, transmitted from the control station at time $t_1$ (TB), and that wanted data signals are consequently recorded before this time $t_2$, a determination is made of the starting position in the storage where the first wanted data signal or signal sample was stored by looking for the location in the storage which was filled an interval of time $\tau$ prior to time $t_2$, and then all of the signals or sample signals recorded after this time $t_2 - \tau$ are reproduced for transmission to the control station.

Once all of the wanted signals are recorded and available for transmission, everything takes place as if the command transmission interval were negligible, i.e., as if a very wide-band means of transmission were available for transmitting the commands.

The apparatus for implementing the method (FIG. 4) is associated with user devices, each of which includes a recording system 1 for recording signals produced by sensing means. This recording system 1 includes an amplifier 2 which is designed to amplify the signals picked up, the input of which is connected either directly to the sensing means in the case of a single sensor C or to the output of a multiplexer (not shown), the different inputs of which are themselves connected, respectively, to the sensing means when the sensing means includes a number of sensors C. The recording system 1 also includes an analog-digital converter 3, a storage device 4 which is connected to the outputs of the converter 3 and an address generator 5. The analog-digital converter 3, the input of which is connected to the output of amplifier 2, samples and converts the amplified analog signal obtained from the sensor C via the amplifier 2 into digital "words". The digital words are recorded in sequence at storage locations in storage device 4 which are successively designated by addresses generated and applied thereto by address generator 5. In this regard, the storage device 4 may comprise a conventional random access memory (RAM). The recording system also includes a clock signal generator 6 which generates a pulse signal H for controlling the timing of operation of the various elements of the system, including the sampling of the analog signal from amplifier 2 by the analog-digital converter 3 and the read/write operation of the storage device 4 of the system.

The apparatus of the invention includes a signal transmitter 7 and a signal receiver 8 which are connected to a narrow-band transmission channel L. This channel can be composed of a radio channel or a two-wire transmission line L, as shown in FIG. 4. Signal receiver 8 is designed to generate in succession two pulses $I_1$, $I_2$ in response to the reception on transmission line L of signals S'i and S'o, respectively, which are delayed by the propagation time interval $\tau$ with respect to the signals Si and So which are transmitted by signal transmitter 7. Pulse $I_1$ is applied to one of the inputs of a bistable multivibrator 9, one of the outputs of which is connected to one of the inputs of an AND gate 10 having two inputs, the second input of the gate 10 being connected to receive the output of clock signal generator 6.

The output of AND gate 10 is connected to the clock input of a sample counter 11 as well as to the clock input of the analog-digital converter 3. The validation input of counter 11 is connected to the output of amplifier 2. The parallel output terminals of sample counter 11 are connected to the corresponding inputs of a register or latch 12 which is designed to receive, at each instant, the contents of the counter 11 and to store these contents when signal $I_2$ from the signal receiver 7 is applied to its enable input. The parallel output terminals of register 12 are connected to the inputs of a subtractor 13, which is adjusted to subtract a predetermined number N from the number stored in register 12. If T is the period of the clock signal produced by the clock signal generator 6, number N is selected such that:

$$NT = \tau \qquad (1)$$

The output terminals of subtractor 13 are connected to a control element 14 which is designed to store the binary value produced at the output of subtractor 13 until the end of the cycle when all of the successive samples of the signals generated by sensor C are recorded and to produce a signal which makes it possible to control address generator 5 at the beginning of the period when the recorded data is reproduced from the storage device 4 for transmission to the control station. One output of counter 11, for example, as provided at the first stage of the counter, where a signal is present having a repetition period corresponding to that of the samples of the analog signal supplied by amplifier 2, is connected to a control input of address generator 5.

The device operates as follows:

After signal receiver 8 detects the arrival of signal $S'i$ via transmission line L (FIG. 2), this receiver 8 generates a signal $I_1$ which activates bistable multivibrator 9 causing the opening of AND gate 10. The clock pulses H generated by clock signal generator 6 are transmitted to analog-digital converter 3 via gate 10, and this makes it possible to sample the applied analog signal from amplifier 2 and convert into digital words the successive samples. The clock pulses 8 are also applied to counter 11 which is incremented one unit every time a new sample is taken of the output of the amplifier 2. By virtue of this fact, the sample counter 11 counts all of the amplified samples from time $t_0$ (FIG. 2) and activates address generator 5 in such a way that the successive digital values are recorded at predetermined addresses of the storage device 4.

After signal receiver 8 detects the arrival of signal $S'o$ via transmission line L (FIG. 2), signal receiver 8 generates the pulse $I_2$ causing the storing in register 12 of the number $N_1$ of samples received at time $t_2$. Transferred to subtractor 13, this number $N_1$ is then reduced by the predetermined number N (equation 1) and the result, i.e., ($N_1-N$), is stored in control element 14 until the end of the recording cycle, when it will be used to identify the starting address of data to be read from the storage device 4 for transmission to the control station.

Since the first samples recorded starting at time $t_0$, i.e., prior to the arrival of the wanted signals at sensor C, should not be taken into consideration when the reading of stored data is carried out, control element 14 is designed to command address generator 5 in such a way that the storage location identified by the first address read in the series of all of the addresses, where the samples are recorded in succession in storage device 4, is equal to $N_1-N$, with this first address corresponding to the storage location of the sample received at time $t_2-\tau$ (FIG. 3), i.e., at reference time $t_1$.

While the embodiment of the apparatus disclosed by way of example herein comprises a system composed of discrete elements, it will be recognized by those of skill in this art that the method of the present invention may be implemented as well by the use of a microcomputer suitably programmed to perform the various stpes of the method fully disclosed herein.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. Method for the remote control of devices located at a distance from a control station to cause said devices to process and record received data signals in response to commands received from said control station on a narrow passband channel, the transmission time of such commands on said transmission channel being predetermined, and which makes it possible for the devices to acquire and process all signals which are received by said devices subsequent to a selected reference time ($t_1$), comprising the steps of transmitting on said narrow passband transmission channel a first command signal at an initial time which precedes the reference time by a time interval which is at least equal to said predetermined transmission time, initiating in said devices the processing and recording of the above-mentioned received signals upon receipt of said first command signal therein, transmitting on said narrow passband transmission channel a second command signal at said selected reference time with this second command signal being received by said devices at a later time ($t_2$) depending on said predetermined transmission time, and identifying from among all of the signals recorded by said devices, those signals recorded at and following a time which is prior to the time ($t_2$) by the amount of said predetermined transmission time.

2. A method according to claim 1, wherein said first command signal is transmitted on said transmission channel so as to be received by all of said devices at or before said selected reference time ($t_1$), and said step of selecting recorded signals includes ignoring all signals recorded between the time of receipt of said first command signal in each device and said selected reference time.

3. A method according to claim 1, wherein said step of initiating the processing and recording of said received signals in each device comprises sampling said received signals at a predetermined rate and storing said signal samples at the same predetermined rate in respective storage locations.

4. A method according to claim 3, wherein said step of identifying recorded signals in each device comprises counting said signal samples from the time of receipt of said first command signal to the time of receipt of said second command signal, and subtracting from the count reached at the time of receipt of said second command signal a number equal to the number of signal samples generated during said predetermined transmission time of said transmission channel at said predetermined rate, the number resulting from said subtracting thereby identifying the sample generated at said selected reference time.

5. Apparatus for the remote control of devices located at a distance from a control station to cause said devices to process and record received signals in response to commands received from said control station on a narrow-band transmission channel, the transmission time of such commands on said transmission channel being predetermined, and which makes it possible for the devices to acquire and identify data signals received after a selected reference time ($t_1$); comprising means for sending on said transmission channel a first command signal at an initial time ($t_i$) and a second command signal at the above-mentioned reference time ($t_1$), said initial time and said reference time being separated by a time interval which is at least equal to said predetermined transmission time of said transmission channel; means associated with each device for generating data signals; means connected to said data signal generating means in each device and responsive to said first command signal transmitted on said transmission channel for successively storing said data signals; counting means for counting the successively stored data signals in each device beginning at the time of receipt of said first command signal; and means for identifying those data signals stored subsequent to said reference time on the basis of the number of signals counted by said counting means between the reception of said first and second command signals and also on the basis of a number which is dependent on said predetermined transmission time of said transmission channel.

6. Apparatus according to claim 5, wherein said data signal storing means includes memory means for storing data signals in respective addressable storage locations, address generator means connected to said memory means for generating address signals to address said storage locations for read/write operations of said memory means, means for generating clock signals at a predetermined frequency, and gate means connected to said clock signal generating means and responsive to said first command signal transmitted on said transmission channel for applying said clock signals to said data signal generating means to control the application of data signals to said memory means.

7. Apparatus according to claim 6, wherein said counting means includes a counter connected to receive said clock signals from said gate means for counting the number of data signals stored in said memory means, latch means connected to said counter for storing the count value thereof at the time of receipt of said second command signal transmitted on said transmission channel, and subtractor means for subtracting from the count value stored in said latch means a predetermined number which is equal to the number of clock signals generated at said predetermined frequency during said predetermined transmission time of said transmission channel, the result of said subtracting providing an identification of the data signal stored in said memory means at said reference time ($t_1$).

8. Apparatus according to claim 7, wherein said address generator means is connected to said counter so as to generate an address signal identifying a successive storage location in said memory means each time said counter is incremented by receipt of a clock signal.

9. Apparatus according to claim 8, wherein said address generator means is connected to receive a signal representing the result of said subtracting by said subtractor means, so that during the reading out of data signals from said memory means, the first address signal applied to said memory means identifies the storage location wherein there is stored the data signal received and stored at said reference time ($t_1$).

10. Apparatus according to claim 6, wherein said data signal generating means includes at least one signal sensor, an analog-digital converter connected to receive an analog signal from said sensor and said clock signal from said gate means for sampling said analog signal at said predetermined frequency and converting said signal samples to digital signals for storing in said memory means.

11. Method for the remote control of acquisition devices located at a distance from a control station through a transmission channel whose transmission time is known to cause said acquisition devices to acquire and keep for further use all data signals received by said acquisition devices subsequent to a reference time ($t_1$) which precedes reception by said acquisition devices of control signals sent by said control station on said transmission channel and indicative of said reference time ($t_1$), comprising the steps of transmitting on said transmission channel a first command signal at an initial time ($t_i$) which precedes the reference time ($t_1$) by a time interval which is at least equal to said known transmission time, initiating in said devices the processing and recording of the above-mentioned received data signals upon receipt of said first command signal therein, transmitting on said transmission channel a second command signal at said reference time ($t_1$) with this second command signal being received by said devices at a later time ($t_2$) depending on said known transmission time, and identifying from among all of the signals recorded by said acquisition devices, those signals recorded at and following a time which is prior to the time ($t_2$) by the amount of said known transmission time.

12. A method according to claim 11, wherein said first command signal is transmitted on said transmission channel so as to be received by all of said devices at or before said selected reference time ($t_1$), and said step of selecting recorded signals includes ignoring all signals recorded between the time of receipt of said first command signal in each device and said selected reference time.

13. A method according to claim 11, wherein said step of initiating the processing and recording of said received signals in each device comprises sampling said received signals at a predetermined rate and storing said signal samples at the same predetermined rate in respective storage locations.

14. A method according to claim 13, wherein said step of identifying recorded signals in each device comprises counting said signal samples from the time of receipt of said first command signal to the time of receipt of said second command signal, and subtracting from the count reached at the time of receipt of said second command signal a number equal to the number of signal samples generated during said predetermined transmission time of said transmission channel at said predetermined rate, the number resulting from said subtracting thereby identifying the sample generated at said selected reference time.

15. Apparatus for the remote control of acquisition devices located at a distance from a control station through a transmission channel whose transmission time is known to cause said acquisition devices to acquire and keep for further use all data signals received by said acquisition devices subsequent to a reference time ($t_1$) which precedes reception by said acquisition devices of control signals sent by said control station on said transmission channel and indicative of said reference time ($t_1$), comprising means for sending on said transmission channel a first command signal at an initial time ($t_i$) and a second command signal at the above-mentioned reference time ($t_2$), said initial time and said reference time being separated by a time interval which is at least equal to said known transmission time of said transmission channel; means associated with each acquisition device for generating data signals; means connected to said data signal generating means and responsive to said first command signal transmitted on said transmission channel for successively storing said data signals; counting means for counting the successively stored data signal beginning at the time of receipt of said first command signal and means for identifying those data signals stored subsequent to said reference time ($t_1$) on the basis of the number of signals counted by said counting means between the reception of said first and second command signals and also on the basis of a number which is dependent on said known transmission time of said transmission channel.

16. Apparatus according to claim 15, wherein said data signal storing means includes memory means for storing data signals in respective addressable storage locations, address generator means connected to said memory means for generating address signals to address said storage locations for read/write operations of said memory means, means for generating clock signals at a predetermined frequency, and gate means connected to said clock signal generating means and responsive to said first command signal transmitted on said transmission channel for applying said clock signals to said data signal generating means to control the application of data signals to said memory means.

17. Apparatus according to claim 16, wherein said counting means includes a counter connected to receive said clock signals from said gate means for counting the number of data signals stored in said memory means, latch means connected to said counter for storing the count value thereof at the time of receipt of said second command signal transmitted on said transmission channel, and subtractor means for subtracting from the count value stored in said latch means a predetermined number which is equal to the number of clock signals generated at said predetermined frequency during said predetermined transmission time of said transmission channel, the result of said substracting providing an identification of the data signal stored in said memory means at said reference time ($t_1$).

18. Apparatus according to claim 17, wherein said address generator means is connected to said counter so as to generate an address signal identifying a successive storage location in said memory means each time said counter is incremented by receipt of a clock signal.

19. Apparatus according to claim 18, wherein said address generator means is connected to receive a signal representing the result of said subtracting by said subtractor means, so that during the reading out of data signals from said memory means, the first address signal applied to said memory means identifies the storage location wherein there is stored the data signal received and stored at said reference time ($ty_1$).

20. Apparatus according to claim 16, wherein said data signal generating means includes at least one signal sensor, an analog-digital converter connected to receive an analog signal from said sensor and said clock signal from said gate means for sampling said analog signal at said predetermined frequency and converting said signal samples to digital signals for storing in said memory means.

* * * * *